Patented Mar. 2, 1954

2,671,118

UNITED STATES PATENT OFFICE 2,671,118

CRYSTALLIZATION OF TRIMETHYLOL ETHANE

Richard C. Gangwer, Allentown, Pa., assignor to Trojan Powder Company, a corporation of Pennsylvania No Drawing. Application August 25, 1951, Serial No. 243,759

2 Claims. (Cl. 260—635)

This invention relates to the crystallization of trimethylol ethane and a new compound thereof.

With such readily soluble materials as trimethylol ethane (hereafter sometimes abbreviated T. M. E.), it is customary in crystallization to make the aqueous solution highly concentrated and in fact frequently near to saturation in the hot condition, cool slowly, so as to promote crystal growth, and then separate the crystals so grown. When T. M. E. solution is so treated, crystallization and subsequent separation of the crystals from the liquor is difficult if not impossible in factory operations at a satisfactory rate. The difficulties include the development during the cooling of a viscous or pasty mass from which the crystals of T. M. E. are difficult to separate. The result at best is an impure product.

I have now discovered that I obtain good crystals of trimethylol ethane, that are readily separable from the aqueous mother liquor, by dilution of the T. M. E. solution with water in amount adequate to dissolve substantially all the T. M. E. at temperatures down to approximately 30° C. and then effecting the crystallization at a temperature below 30° C.

I have discovered also that, when trimethylol ethane is crystallized from the water solution at a temperature below about 30° C., there is produced a new compound, namely, the dihydrate of trimethylol ethane. This may be written $$CH_3.C(CH_2OH)_3.2H_2O$$

Whether any other polyhydric alcohols have been crystallized with the inclusion of water of crystallization, I do not know. It is a fact, however, that my crystals of the trimethylol ethane, when dried, still contain about 23% of water. In the ether washed and dried crystals, I find 22.9%. The theory for the hydrate with 2 mols of water to 1 mol of trimethylol ethane is 23.08%.

Briefly stated, the present invention comprises these discoveries and the application of them in effecting separations of T. M. E. from water and other materials.

The new compound T. M. E. $2H_2O$ has interesting properties. It has a definite transition point of about 30.2° C. This transition point was determined as follows: A solution of T. M. E. in water is made up of such a concentration that the T. M. E. anhydrate begins to crystallize out at about 40° C. Such solution is warmed to 50° C. and then slowly cooled. At 40° C. crystals of T. M. E. without water of crystallization start to form. The cooling is continued with stirring and T. M. E. crystals having no water of crystallization continue to form. The solution is cooled to about 20° C. when the rate of crystallization increases and the temperature of the solution rises. This phenomenon is caused by T. M. E. $2H_2O$ forming from a solution that is supersaturated with regard to this substance. The temperature of the solution increased to 30.2° C. at which temperature it held for two minutes before the temperature again began to fall. This was taken as the transition point.

If a sample of dihydrate is carefully dried, which can be accomplished by throwing the crystals into some very low boiling solvent which is partly miscible with water such as ether and then evaporating off the ether, and the dried T. M. E. $2H_2O$ is gradually warmed, it will be found that at 30.3° C. the crystals will start to liquefy and will then dissolve in their own water of crystallization. The difference between the transition point of 30.2° C. and this liquefying temperature of 30.3° C. probably results in slight inaccuracies in the two temperature measurements.

The dihydrate has an appreciable vapor pressure even below the transition point; as a result there is some loss of water from the crystals when they stand for a long time in a dry atmosphere even at low temperatures. The crystal form is tetragonal and prismatic; the color, colorless; and the habit, well formed square plates.

As to the proportion of water at the time of crystallization, it must correspond at least to that amount required to supply $2H_2O$ for each mol of T. M. E. If purification is to be effected, there must be an excess of the water for removal as mother liquor containing the impurities. Suitable proportions of water are at least approximately 40–50 parts for 100 parts of the trimethylol ethane. A somewhat smaller portion, such as 35 parts of water, may be used with less satisfactory purification when separation of the mother liquor from the crystals is attempted. The proportion of water should not be so high as to retain most of the trimethylol ethane in the mother liquor and thus prevent a good yield of the trimethylol ethane crystals.

The temperature at which the crystallization is effected is produced by a conventional method of cooling. The temperature must be below the transition point of about 30° C. and also below the temperature at which the trimethylol ethane, in the proportion used, will give saturation of the solution. When the concentration of T. M. E. is similar to that given in Example 1 below, it has been found that, when the solution is cooled to about 15° C., a mass of crystals is formed that will provide a slurry from which a good crop of crystals in pure form can readily be separated from the mother liquor. The temperature must be above that of freezing of the aqueous solution as a whole if purification is to be effected by separation of crystals from the remaining mother liquor.

The crystallization process gives a mixture of crystals and liquor from which the liquor is readily separated, as by centrifuging, filtering or like procedure without change of state of the materials being separated.

The invention will be further illustrated by description in connection with the following specific examples of the practice of it. In these examples and elsewhere herein, proportions are expressed as parts by weight unless specifically stated to the contrary. It will be understood, also, that the trimethylol ethane to be purified is made in a usual manner, as by the reaction of 3 mols of formaldehyde in aqueous solution with 1 mol of propionaldehyde in contact with 0.6 mol of lime as the catalyzing agent; evaporating off practically all of the water; and then removing, by centrifuging, the calcium formate crystals which form during the evaporation of the water.

*Example 1*

450 pounds of the crude almost water free trimethylol ethane so made are added to 200 pounds of hot water. The whole is heated until the trimethylol ethane dissolves. The solution is then cooled in a vessel provided with suitable agitation, until the temperature is lowered to 15° C., whereupon there is obtained about 400 lbs. of pure crystalline trimethylol ethane with two molecules of water of crystallization, in a form that can be readily separated from its mother liquor in pure state. Crystals begin to separate at a temperature below 30° C. After separating the crystals from the mother liquor, as by filtration or centrifuging, the crystals are washed with water, to give practically pure trimethylol ethane 2H₂O.

*Example 2*

450 pounds of crude trimethylol ethane which had been separated from the by-product calcium formate are added to 200 pounds of hot water. The whole is heated until the trimethylol ethane dissolves. The solution is then cooled in a water jacketed vessel equipped with a stirrer until the temperature falls to 27° C. and there is an indication that the trimethylol ethane is about to begin to crystallize out. The cooling water is shut off from the jacket and sudden refrigeration, by direct expansion of ammonia, is substituted. The temperature is lowered quickly to 15° C. In 2 hours' time, there is obtained a good yield of crystalline trimethylol ethane in a form that is readily filtered. Analysis for water content of the dried crystals shows them to be the dihydrate.

The further removal of any mother liquor that might be attached to the crystals can be accomplished by a recrystallization from water under the same conditions.

The new method and the compound T. M. E. 2H₂O are useful in effecting the separation of pure T. M. E. from the impurities and other compounds in the crude T. M. E. Also, the dihydrate is useful as a source of relatively pure T. M. E. and is converted thereto by evaporation of the water content at moderately elevated temperatures with the aid of vacuum.

It will be understood that it is intended to cover all changes and modifications of the examples of the invention herein chosen for the purpose of illustration which do not constitute departures from the spirit and scope of the invention.

What is claimed is:

1. Trimethylol ethane dihydrate of the composition represented by the formula $$CH_3C(CH_2OH)_3 \cdot 2H_2O$$

and having a transition point of about 30.2° C.

2. In crystallizing trimethylol ethane, the method which comprises forming a solution of the trimethylol ethane in water in the proportion of at least about 35–50 parts by weight of water to 100 of the trimethylol ethane, cooling the solution to a temperature below about 30° C. and below that of saturation of the solution used, and maintaining the solution in the cooled condition until crystals of hydrated trimethylol ethane separate from the solution, the exact proportion of water above the minimum stated being adequate to retain the trimethylol ethane in solution at about 30° C.

RICHARD C. GANGWER.

References Cited in the file of this patent

UNITED STATES PATENTS

| Number | Name | Date |
|---|---|---|
| 2,304,985 | Wyler | Dec. 15, 1942 |
| 2,420,496 | Poitras et al. | May 13, 1947 |
| 2,468,718 | Wyler | Apr. 26, 1949 |